United States Patent
Lewis

(10) Patent No.: US 11,584,272 B2
(45) Date of Patent: Feb. 21, 2023

(54) STRUCTURAL DUCT WITH SEAT ATTACHMENT

(71) Applicant: Ford Global Technologies, LLC, Dearborn, MI (US)

(72) Inventor: Thomas Matthew Lewis, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 485 days.

(21) Appl. No.: 16/816,022

(22) Filed: Mar. 11, 2020

(65) Prior Publication Data
US 2021/0284052 A1    Sep. 16, 2021

(51) Int. Cl.
| B60N 2/56 | (2006.01) |
| B60H 1/24 | (2006.01) |
| B60H 1/00 | (2006.01) |

(52) U.S. Cl.
CPC ....... B60N 2/5628 (2013.01); B60H 1/00564 (2013.01); B60H 1/246 (2013.01)

(58) Field of Classification Search
CPC ... B60H 1/00564; B60H 1/246; B60N 2/5628
USPC .......................................... 454/120; 296/208
See application file for complete search history.

(56) References Cited

U.S. PATENT DOCUMENTS

| 2,992,605 | A |   | 7/1961 | Trotman et al. |
| 7,001,264 | B2 |   | 2/2006 | Hayashi et al. |
| 8,118,354 | B2 | * | 2/2012 | Lucas ................ B60H 1/00278 |
|           |    |   |        | 296/65.09 |
| 9,914,336 | B2 | * | 3/2018 | Smith ..................... B60L 50/66 |
| 2011/0162901 | A1 | * | 7/2011 | Lucas ..................... B60L 1/003 |
|           |    |   |        | 180/68.2 |

FOREIGN PATENT DOCUMENTS

| EP | 3594050 A1 | 1/2020 |
| JP | 5732829 B2 | 6/2015 |
| JP | 2018199468 A | 12/2018 |

* cited by examiner

*Primary Examiner* — Avinash A Savani
*Assistant Examiner* — Dana K Tighe
(74) *Attorney, Agent, or Firm* — Vichit Chea; Price Heneveld LLP

(57) ABSTRACT

A ventilation assembly for a vehicle includes a duct disposed between a seating assembly and a vehicle floor having a first end with a first opening disposed at a first area of the vehicle and a second end with a second opening disposed at a second area of the vehicle. An air mover is disposed at one or more of the first and second ends of the duct, wherein the air mover is operable to move air along the duct.

20 Claims, 11 Drawing Sheets

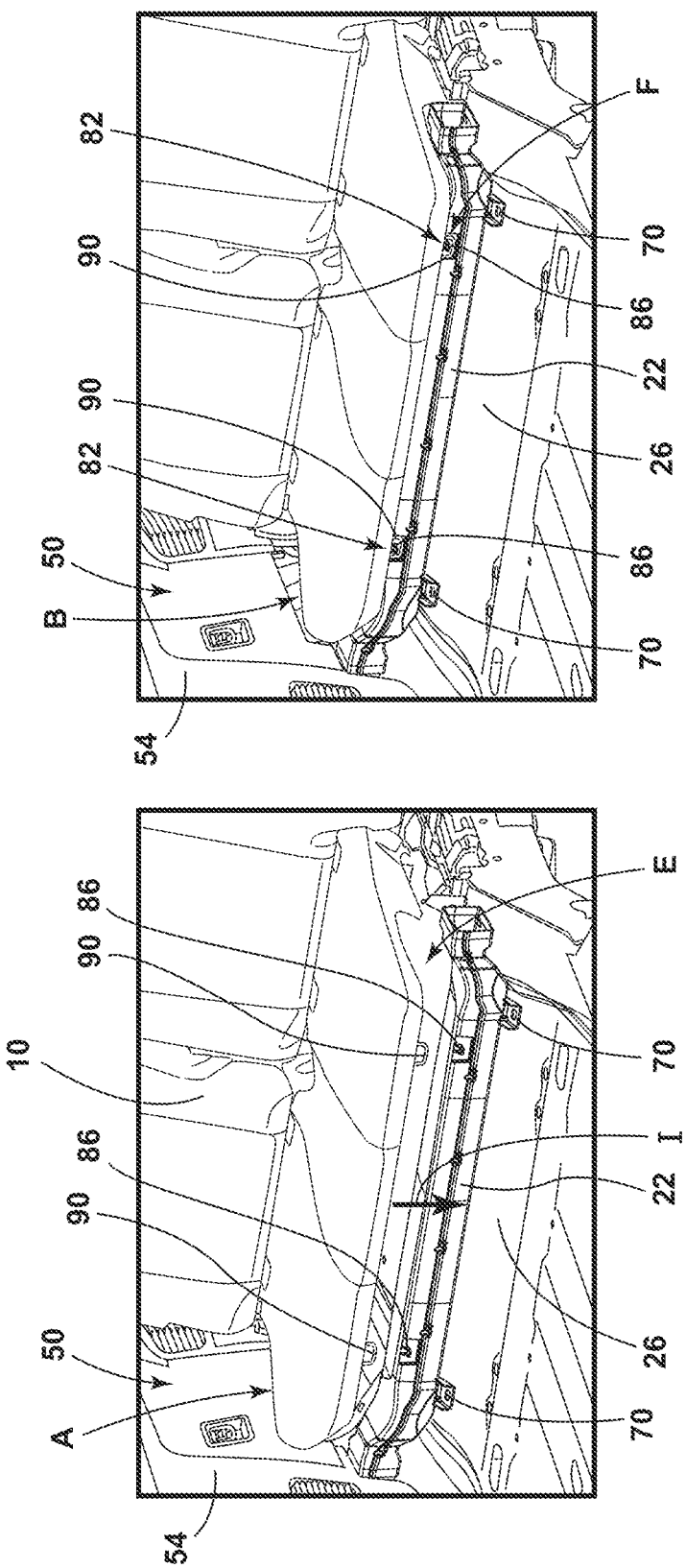

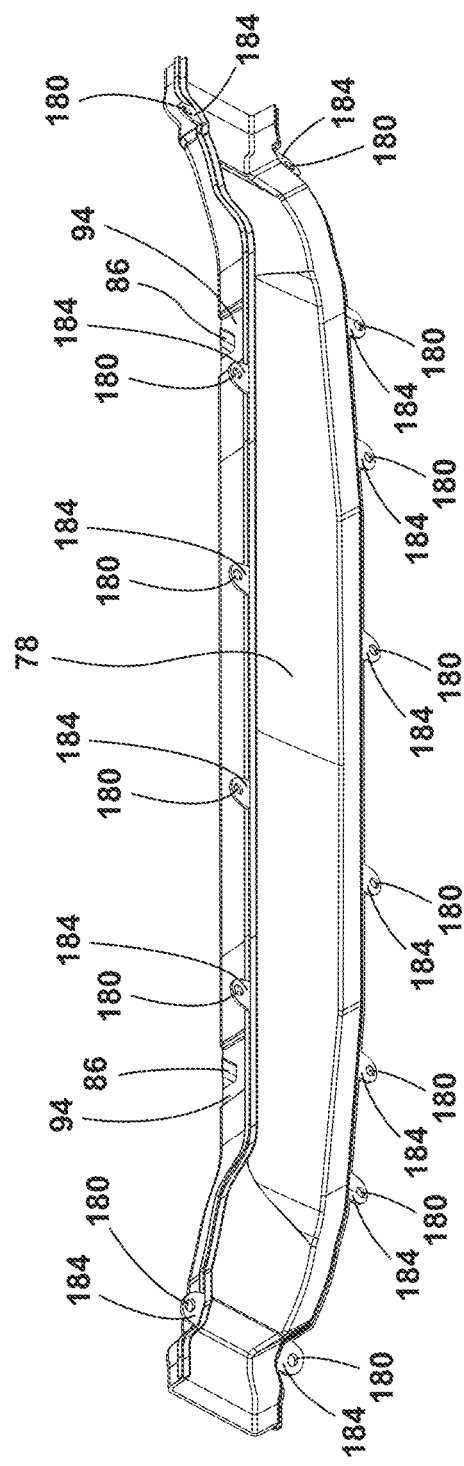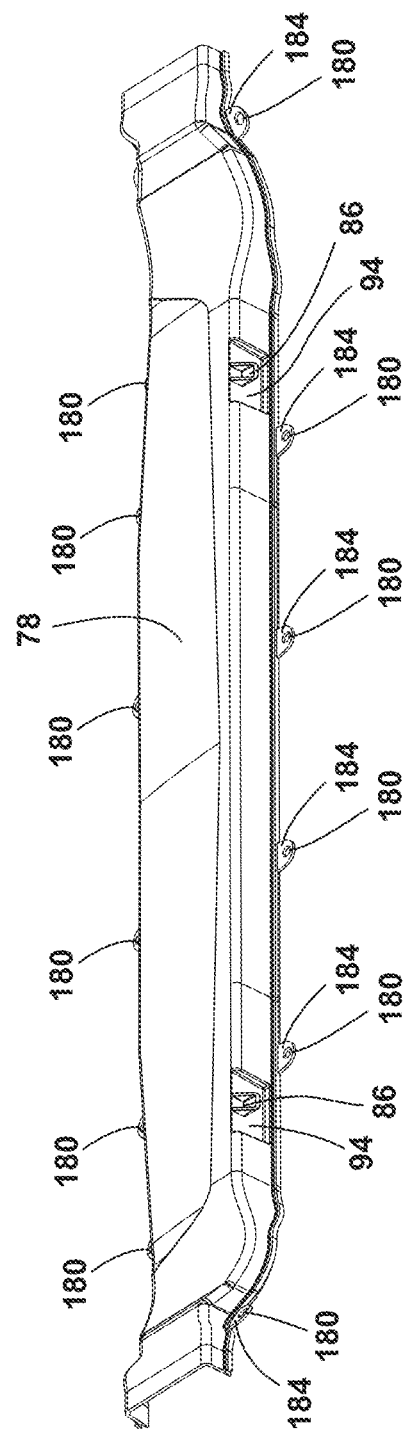

STRUCTURAL DUCT WITH SEAT ATTACHMENT

FIELD OF THE DISCLOSURE

The present disclosure generally relates to a ventilation assembly for a vehicle.

BACKGROUND OF THE DISCLOSURE

Air circulation in a vehicle cabin may increase passenger comfort. Ducts may be used to transfer air between areas of a vehicle cabin. Ducts may also be structural members of a vehicle.

SUMMARY OF THE DISCLOSURE

According to one aspect of the present disclosure, a ventilation assembly for a vehicle includes a duct disposed between a seating assembly and a vehicle floor having a first end with a first opening disposed at a first area of the vehicle and a second end with a second opening disposed at a second area of the vehicle. An air mover is disposed at one or more of the first and second ends of the duct, wherein the air mover is operable to move air along the duct.

Embodiments of the first aspect of the disclosure can include any one or a combination of the following features:
- the duct provides a structural support for the vehicle seating assembly;
- the first end of the duct is disposed proximate the first vehicle wall;
- the second end of the duct is disposed proximate a second vehicle wall;
- the first end is coupled to a HVAC unit;
- an attaching mechanism is disposed between the duct and the seating assembly;
- the attaching mechanism is disengaged prior to installation of the seating assembly in the vehicle interior;
- the attaching mechanism is engaged after the installation of the seating assembly in the vehicle interior;
- the attaching mechanism includes a first part disposed on the duct and a second part disposed on the seating assembly;
- the first part includes a hook;
- the second part includes a loop;
- the duct includes a locating pocket, wherein the hook extends from the locating pocket, and wherein the loop is positioned in the locating pocket when the attaching mechanism is engaged; and
- the hook includes a downward sloping portion protruding from the duct and terminating at a cantilevered portion extending outward from the duct.

According to a second aspect of the present disclosure, a support structure for a vehicle seat includes a duct extending between a first and a second area of a vehicle and positioned below the vehicle seat and having a first end coupled to an air source and a second end coupled to an air distribution device with an outlet extending into a vehicle cabin. An attaching mechanism is disposed between the duct and the vehicle seat and positionable in an engaged position to secure the vehicle seat to the duct.

Embodiments of the second aspect of the disclosure can include any one or a combination of the following features:
- a floor liner disposed on the duct;
- a portion of the attaching mechanism disposed between the duct and the vehicle seat extends through the floor liner;
- the duct includes an upper portion coupled to a lower portion; and
- a locating pocket for positioning the attaching mechanism is disposed in the upper portion of the duct.

According to a third aspect of the present disclosure, a method for installing a seating assembly in a vehicle includes positioning a ventilation duct, with a first part of an attaching mechanism, for delivering air from a first area of a vehicle to a second area of a vehicle proximate a vehicle floor, lowering the seating assembly, with a second part of the attaching mechanism, onto the duct, and securing the first part of the attaching mechanism to the second part of the attaching mechanism.

Embodiments of the third aspect of the disclosure can include any one or a combination of the following features:
- positioning the duct so that it extends between opposing walls of a vehicle interior and placing a front portion of a seat disposed in the seating assembly over the duct.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 2A is a perspective view of a seating assembly disposed above a duct in an assembly position and an attaching mechanism in a disengaged position;

FIG. 2B is a perspective view the seating assembly of FIG. 2A disposed on a duct in a use position and an attaching mechanism in the engaged position;

FIG. 9 is a bottom perspective view of the upper part of the duct;

FIG. 10 is a top perspective view of the lower part of the duct;

DETAILED DESCRIPTION

Figure 1:
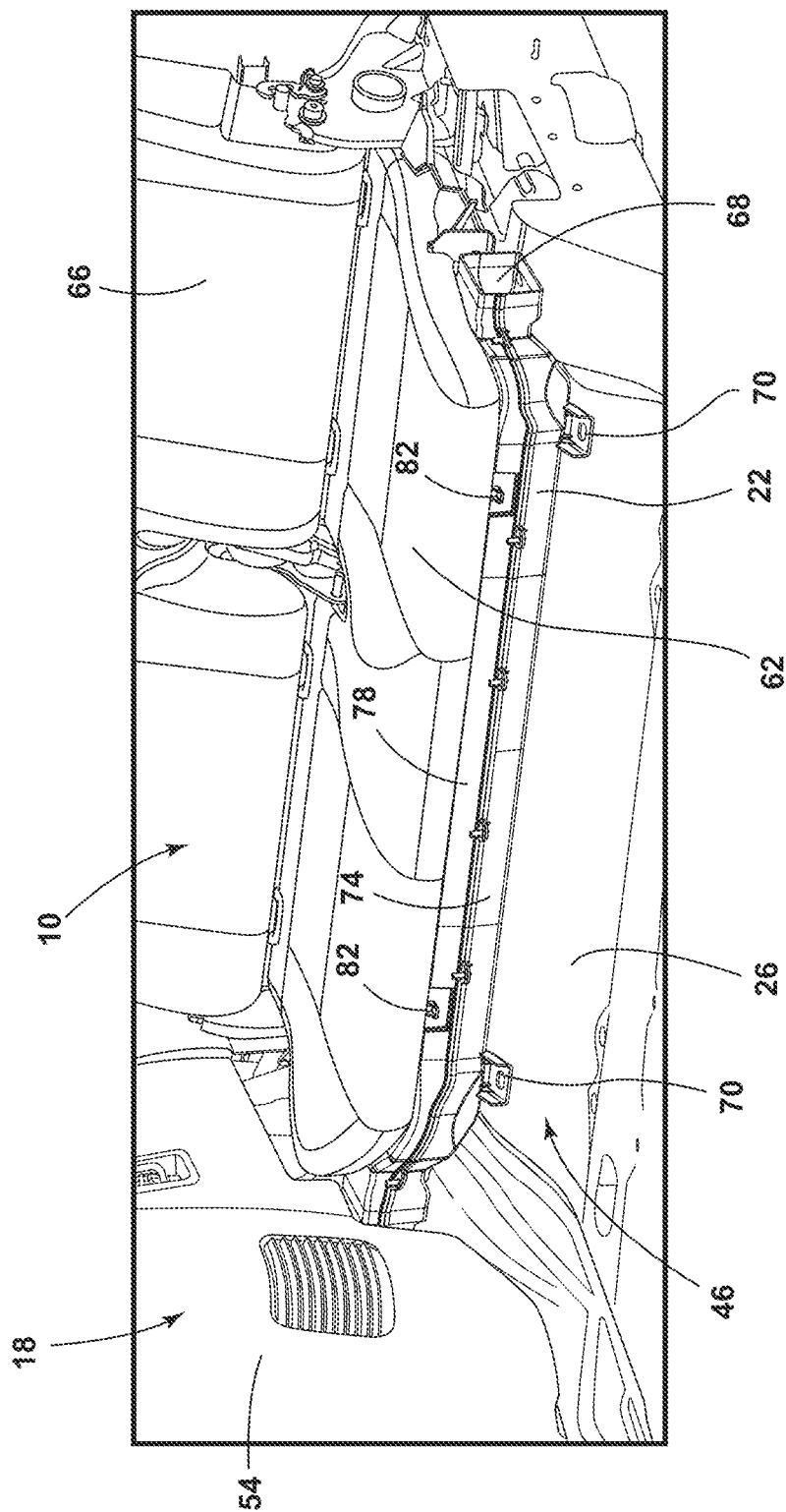
FIG. 1 is a perspective view of a seating assembly and a duct disposed in a vehicle interior.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings and described in the following specification are simply exemplary aspects of the inventive concepts defined in the appended claims. Hence, specific dimensions and other physical characteristics relating to the aspects disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As required, detailed aspects of the present disclosure are disclosed herein; however, it is to be understood that the disclosed aspects are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

With reference to the seating assembly 10 described below and shown in the attached figures, a seating assembly 10 may be described from the vantage point of a passenger seated in the seating assembly 10. The side of a seating assembly 10 disposed on a right side of a seated passenger may be referred to as a right side of the seating assembly 10. The side of a seating assembly 10 disposed on a left side of a seated passenger may be referred to as a left side of the seating assembly 10.

Referring to FIGS. 1-12, a ventilation assembly (for example, Heating Ventilation Air Conditioning ("HVAC") ventilation assembly 120) for a vehicle 18 includes a duct 22. The duct 22 is disposed between a vehicle seating assembly 10 and a vehicle floor 26. The duct 22 includes a first end 30 having a first opening 34 disposed at a first area of the vehicle 18 and a second end 38 having a second opening 42 disposed at a second area of the vehicle 18. An air mover (for example, HVAC unit 124) is disposed at one or more of the first and the second ends 30, 38 of the duct 22. The air mover is operable to move air along the duct 22.

Figure 4:
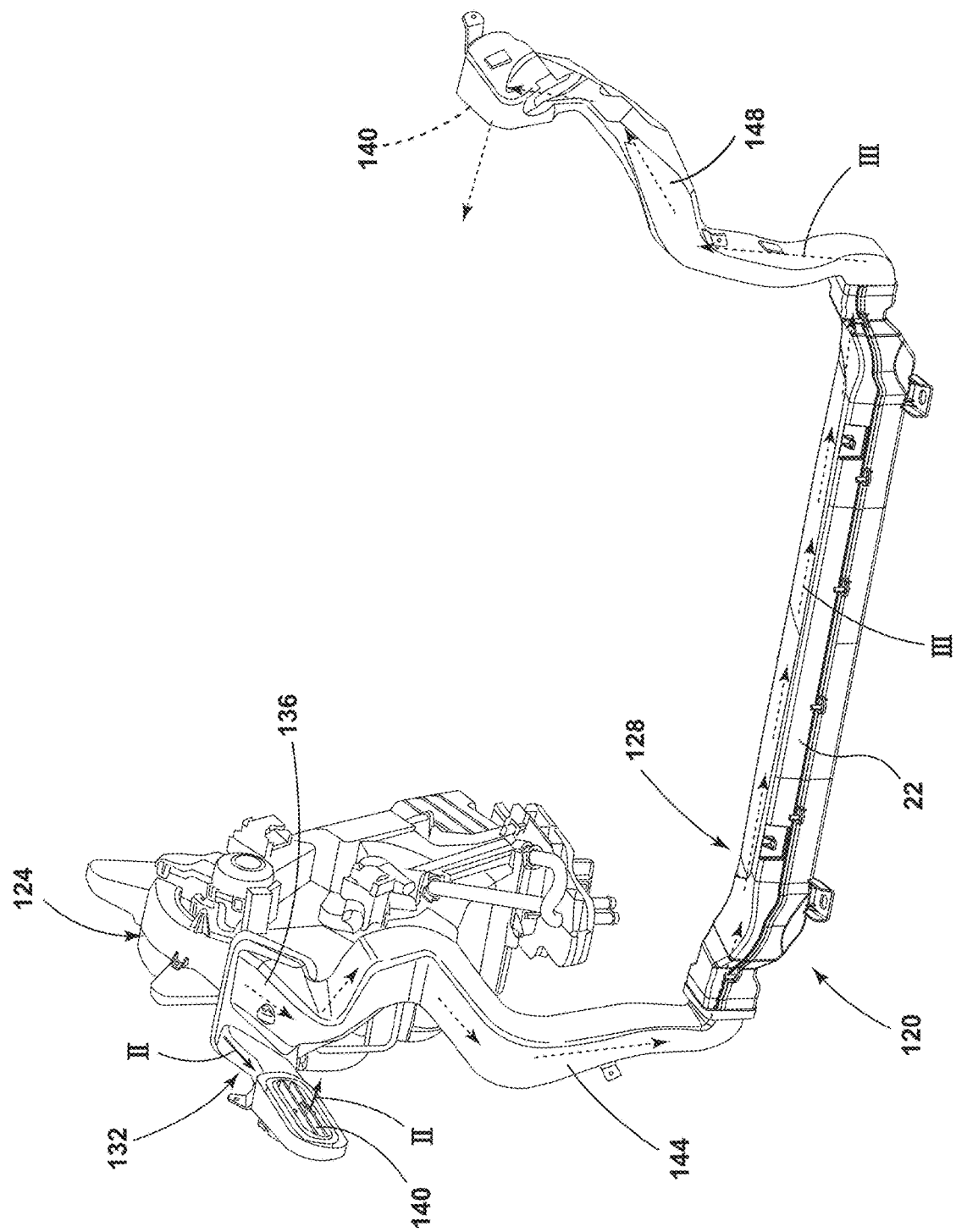
FIG. 4 is a perspective view of a ventilation assembly.

Referring to FIG. 1, a vehicle interior 50 is shown. A duct 22 may provide a structural support for the seating assembly 10. The duct 22 may be part of an HVAC ventilation assembly 120. (FIG. 4.) The duct 22 may extend between a vehicle side wall 54 and a vehicle side wall 58. The seating assembly 10 may include a seat 62 and a seatback 66. The duct 22 may include a square shaped cross-section 68 at various locations along the length of the duct 22. Fasteners 70 may secure the duct 22 to an area of the vehicle floor 26 disposed above the tire wells. As such, the area of the vehicle floor 26 below the duct 22 may be elevated relative to the area of the vehicle floor 26 toward the front of the vehicle 18. The duct 22 may include two parts 74, 78. The two parts may be referred to as the lower part 74 and the upper part 78. At least one attaching mechanism 82 may be disposed between the duct 22 and the seating assembly 10. Two attaching mechanisms 82 are shown in FIG. 1.

With reference to FIGS. 2A-2B, installation of the seating assembly 10 in the vehicle 18 is shown. The seating assembly 10 is shown in the assembly position A in FIG. 2A. The seating assembly 10 may be lowered into the vehicle interior 50 at a manufacturing facility. The seating assembly 10 may be positioned above the duct 22. The seating assembly 10 may be positioned so that the attaching mechanism 82 between the seating assembly 10 and the duct 22 may be engaged when the seating assembly 10 is lowered on the duct 22. The attaching mechanism 82 may include a first part and a second part. In the example shown, the first part includes a hook 86 extending outward from the duct 22, and the second part includes a loop 90 extending downward from the seating assembly 10. The loop 90 may be a wire, a plastic piece, or an article made of another material. The hook 86 may be positioned in a locating pocket 94 in the duct 22. The locating pocket 94 may be referred to as a recess. The attaching mechanism 82 is shown in the disengaged position E. As the seating assembly 10 is lowered downward onto the duct 22 in the direction shown by arrow I, the loops 90 may engage with the hooks 86 to position the seating assembly 10 on the duct 22. Operators at the manufacturing facility may perform a separate operation to secure the rear of the seating assembly 10 to the vehicle 18.

Referring to FIG. 2B, the seating assembly 10 is shown in the use position B. The seating assembly 10 has been lowered onto the duct 22. The attaching mechanism 82 is in the engaged position F. The loop 90 is disposed around the hook 86.

Figure 3B:
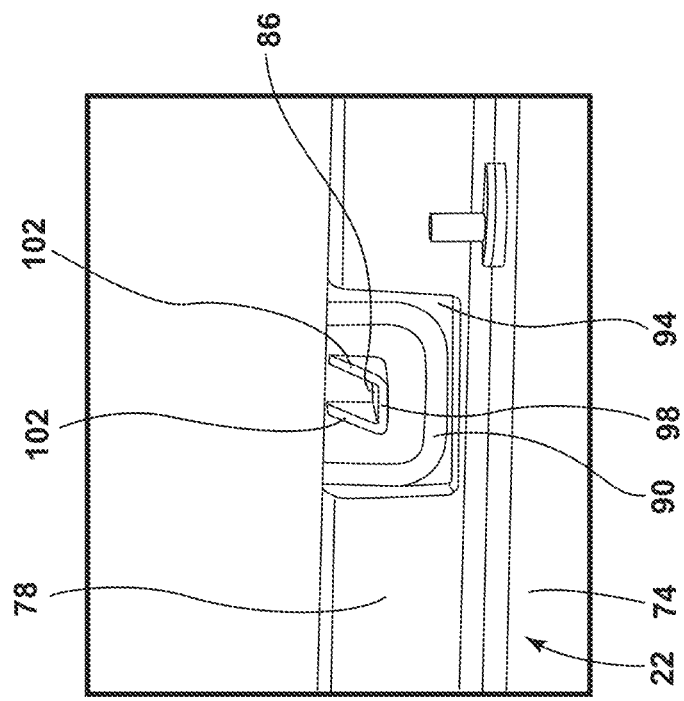
FIG. 3B is an exploded view of a portion of the attaching mechanism of FIG. 2B in an engaged position.
Figure 3A:
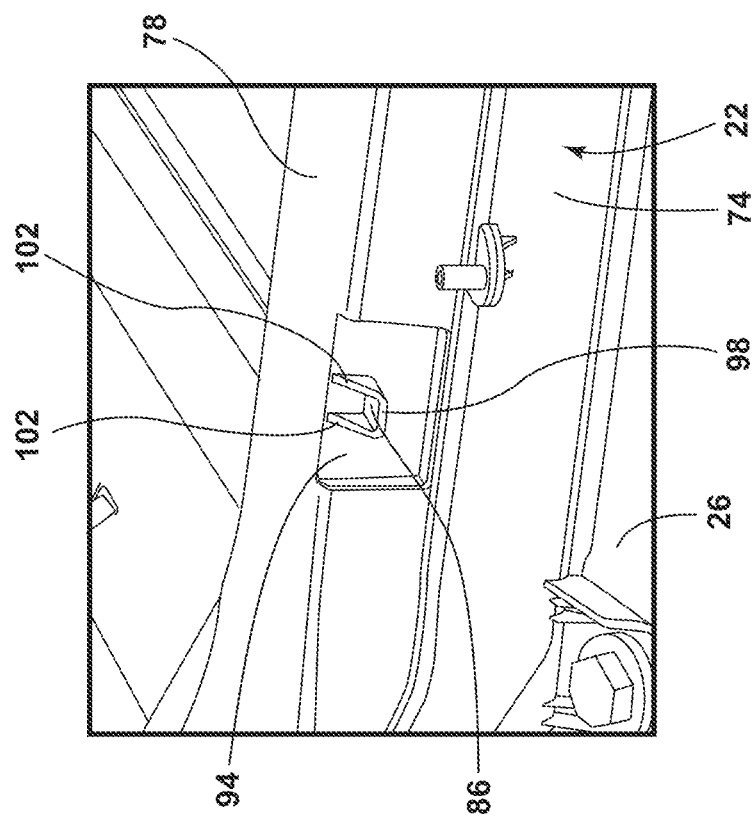
FIG. 3A is an exploded view of a portion of the attaching mechanism of FIG. 2A in a disengaged position.

Referring to FIG. 3A, an exploded view of the hook 86 is shown. The hook 86 is shown extending from the locating pocket 94 in the upper part 78 of the duct 22. In various examples, the duct 22 may be made of a composite plastic. The hook 86 may be molded in the composite plastic. In various examples, the duct 22 and the hook 86 may be aluminum or another metal. The locating pocket 94 may receive the wire loop 90 from the seat 62 for a hands-free installation at the front of the seat 62 during the vehicle assembly process. The hook 86 may include a cantilevered portion 98 extending from the locating pocket 94 portion of the duct 22. The hook 86 may include two opposing slanted sides 102 that may extend from the locating pocket 94 to the cantilevered portion 98. The opposing slanted sides 102 of the hook 86 may allow the downward moving loop 90 to slide along the hook 86 until the loop 90 passes the cantilevered portion 98 of the hook 86 and moves below the cantilevered portion 98 of the hook 86 and within the locating pocket 94.

Referring to FIG. 3B, the loop 90 is shown positioned in the locating pocket 94 and engaged with the hook 86. As such, the attaching mechanism 82 is shown in the engaged position F.

Referring to FIG. 4, a ventilation assembly 120 is shown. The ventilation assembly 120 may include a Heating Ventilation Air Conditioning ("HVAC") unit 124 and a duct assembly 128. The duct assembly 128 may include duct branches 132, 136. The HVAC unit 124 may deliver air to passengers seated on opposing sides of a vehicle interior 50. Conditioned or ambient air from the HVAC unit 124 may be blown into the two duct branches 132, 136. A duct branch 132 may extend along a first vehicle side wall 54. A vent 140 may be disposed at the end of the duct branch 132. Arrows II show the flow of air along the duct branch 132.

The duct branch 136 may include a conduit 144 disposed between the HVAC unit 124 and the duct 22 and a conduit 148 disposed between the duct 22 and a vent 140. The conduits 144 and 148 may be designed to route air to and from, respectively, the duct 22. Each vent 140 may include means for regulating the flow of air into the vehicle interior 50. The duct branch 136 may be designed to route around vehicle components disposed along the vehicle walls 54, 58 and on the vehicle floor 26. Arrows III show the flow of air along the duct branch 136. As such, the duct 22 serves as a part of the duct assembly 128, a structural support for the seating assembly 10, a reference point for the positioning the seating assembly 10 in the vehicle 18, and a location for an attachment point for securing the seat 62 to the vehicle interior 50.

In various examples, the duct 22 may be coupled to an air source. The air source may include an air mover (for example, an HVAC unit) or other air source (for example, air outside of the vehicle). In various examples, the duct 22 may be coupled to an air distribution device, including an outlet that may include the conduit 148 and the vent 140, as well as other structures and means for air distribution.

Figure 5:
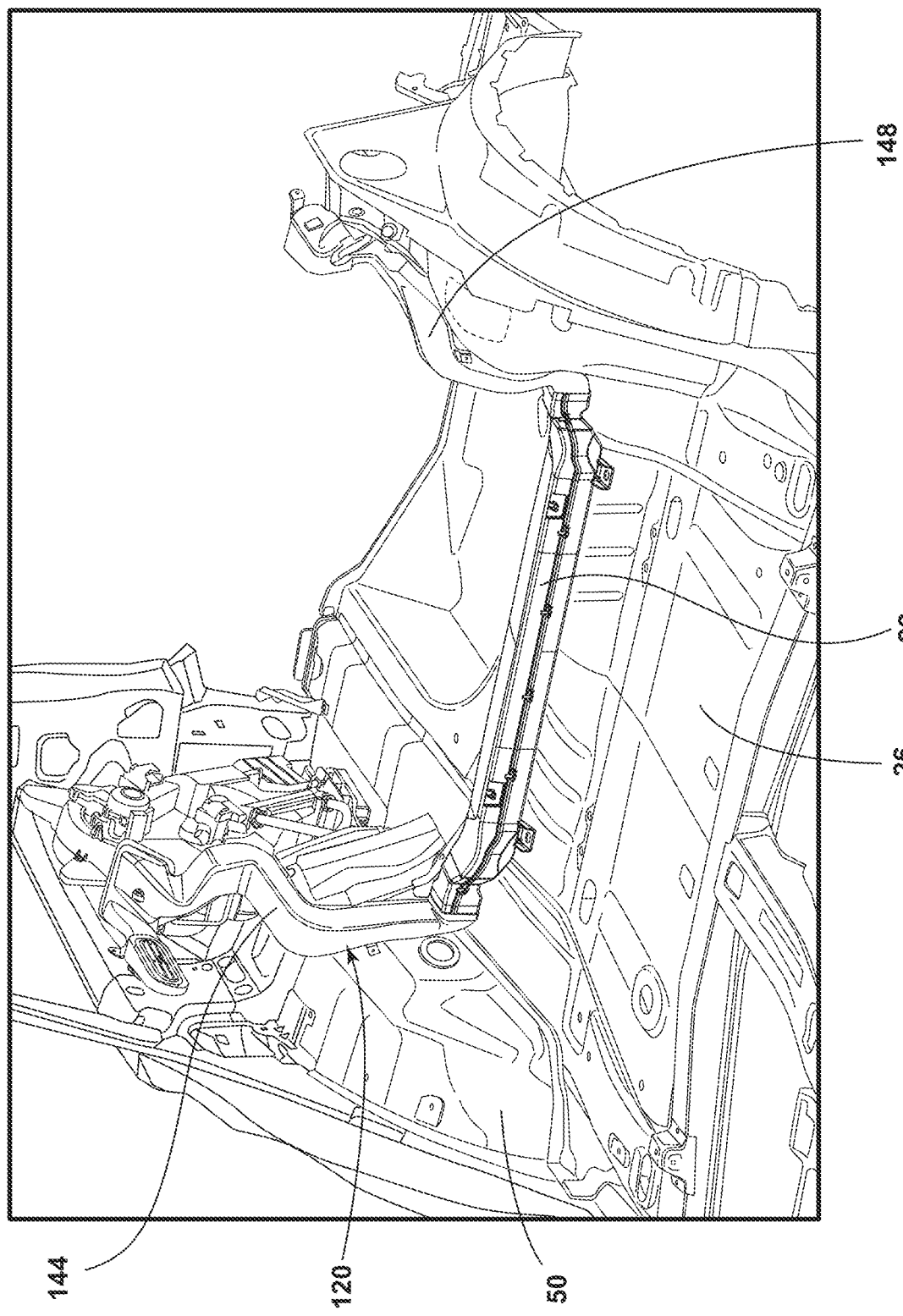
FIG. 5 is a perspective view of a ventilation assembly disposed in a vehicle body.

Referring to FIGS. 5-8, steps of the vehicle assembly process are shown. FIG. 5 shows the ventilation assembly 14 installed in the vehicle interior 50.

Figure 6:
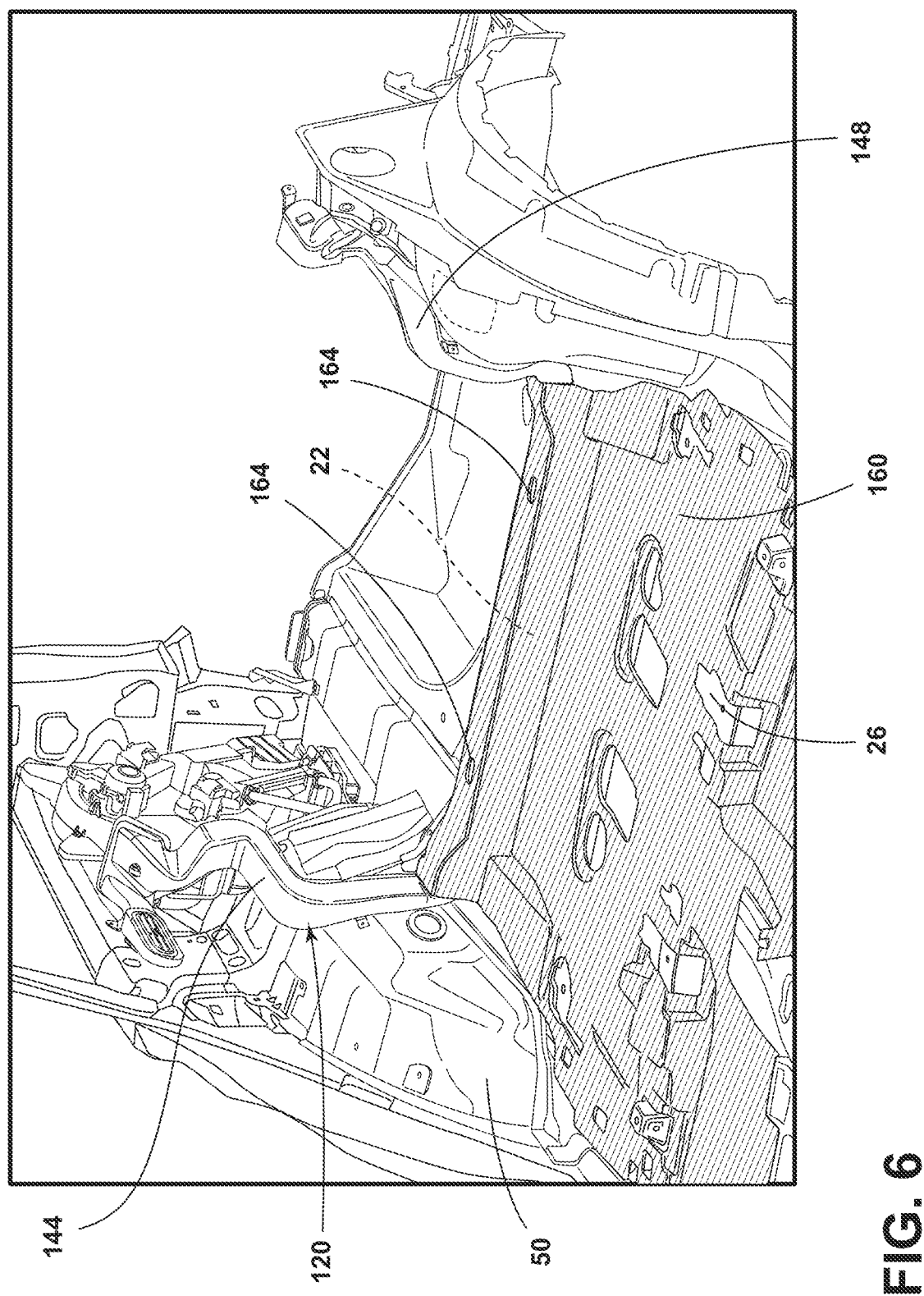
FIG. 6 is a perspective view of a ventilation assembly and a floor liner partially disposed in a vehicle body.

FIG. 6 shows a floor liner 160 disposed on the vehicle floor 26 and over the duct 22. The floor liner 160 may be shaped to conform to the contours of the vehicle interior 50. The floor liner 160 may include openings 164 for the loops 90 to pass through to attach to the hooks 86 of the duct 22. The floor liner 160 may be a carpet.

Figure 7:
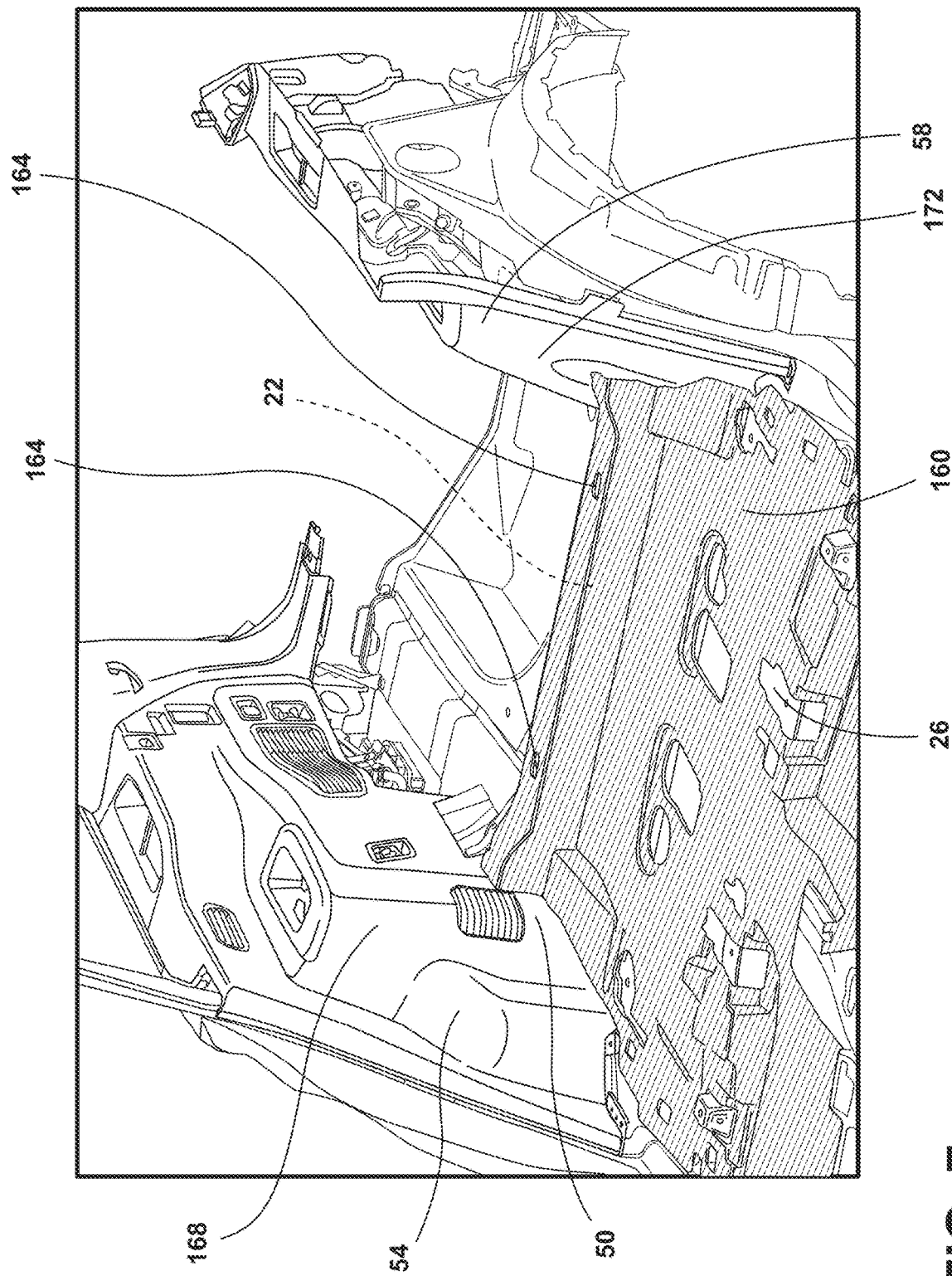
FIG. 7 is a perspective view of a ventilation assembly, a floor liner, and side trim panels disposed in the vehicle body.

FIG. 7 shows side trim panels 168, 172 installed on both sides of the vehicle interior 50. The side trim panels 168, 172 may be referred to as quarter trim. The side trim panels 168, 172 may be installed over the duct member 144 of the duct assembly 128 and the conduit 148 of the duct branch 136.

Figure 8:
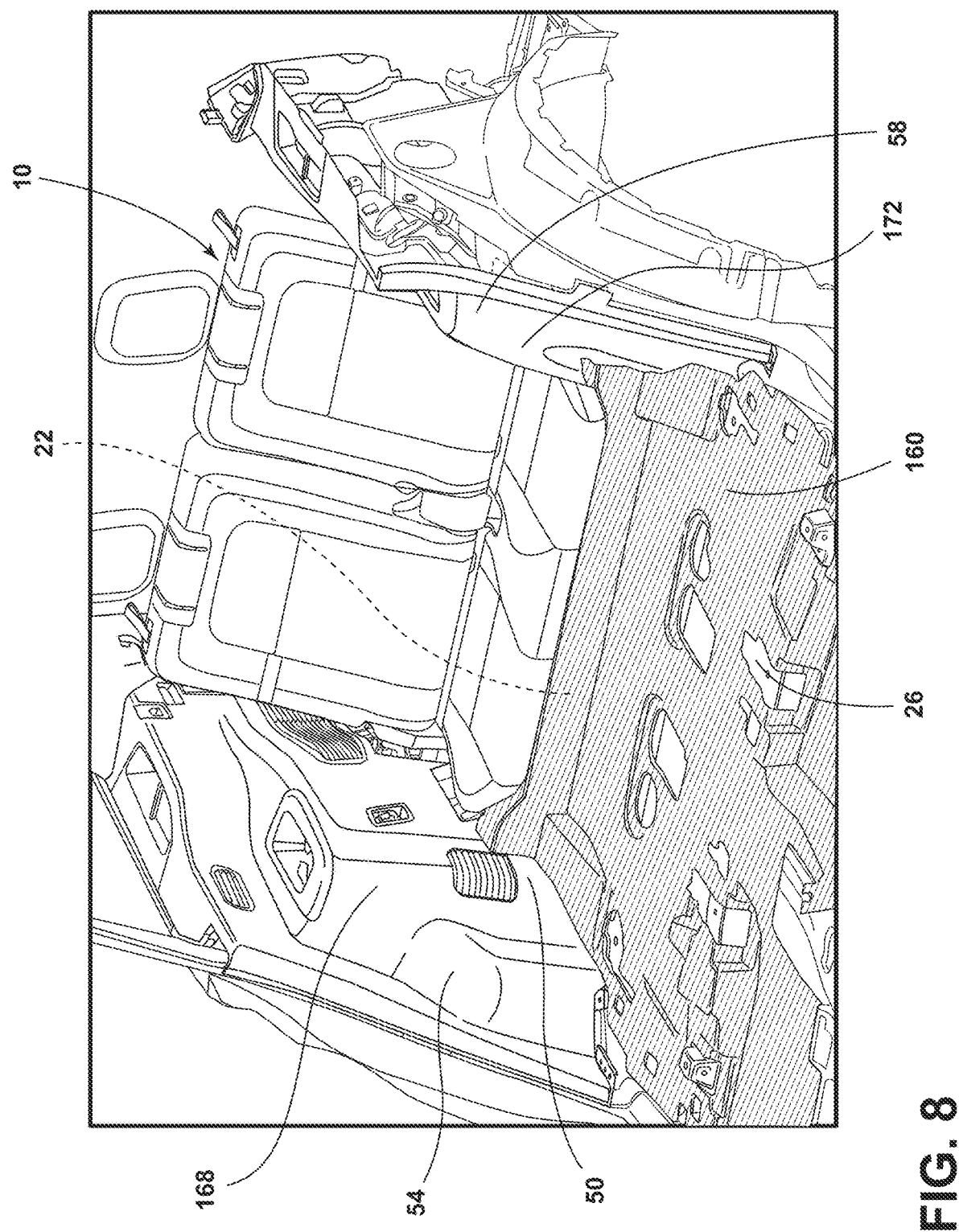
FIG. 8 is a perspective view of a ventilation assembly, a floor liner, side trim panels, and a seating assembly disposed in the vehicle body.

FIG. 8 shows a seating assembly 10 installed in the vehicle 18. The seating assembly 10 may be loaded into the vehicle 18 from the rear of the vehicle 18. The seating assembly 10 may be positioned atop the duct 22, and the seating assembly 10 may be placed downward onto the duct 22 (in the direction shown by arrow I in FIG. 2A) so that the loop 90 extending from the seating assembly 10 snaps onto the hook 86 protruding from the duct 22.

FIGS. 9-10 show the upper part 78 of the duct 22. Hooks 86 are shown extending from the locating pockets 94. The duct 22 includes flanges 184 with holes 180 for attaching the upper part 78 of the duct 22 to the lower part 74 of the duct 22.

Figure 11:
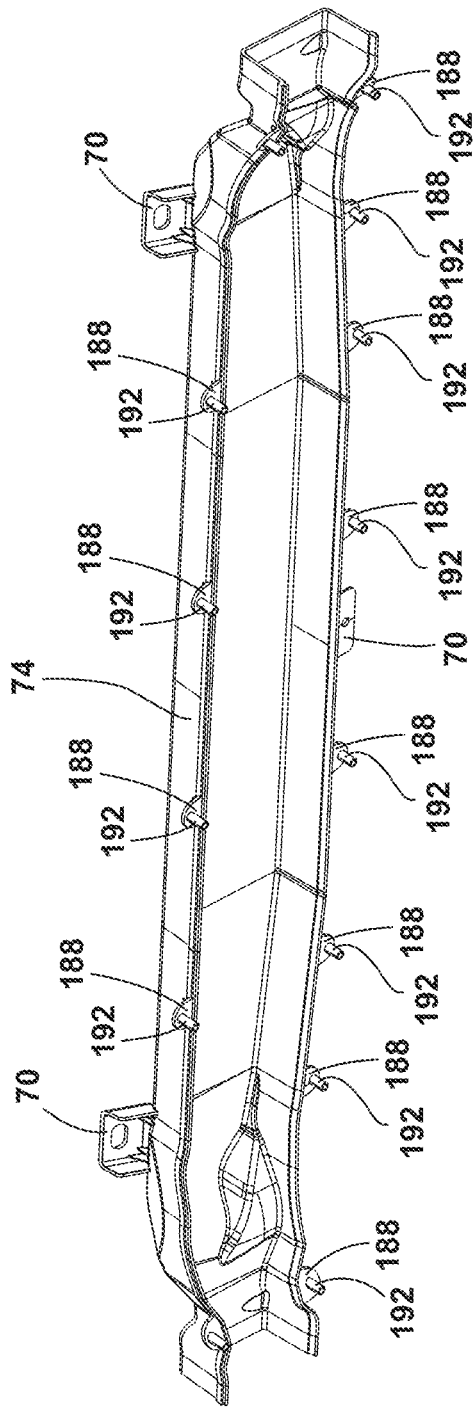
FIG. 11 is a top perspective view of the lower part of the duct.
Figure 12:
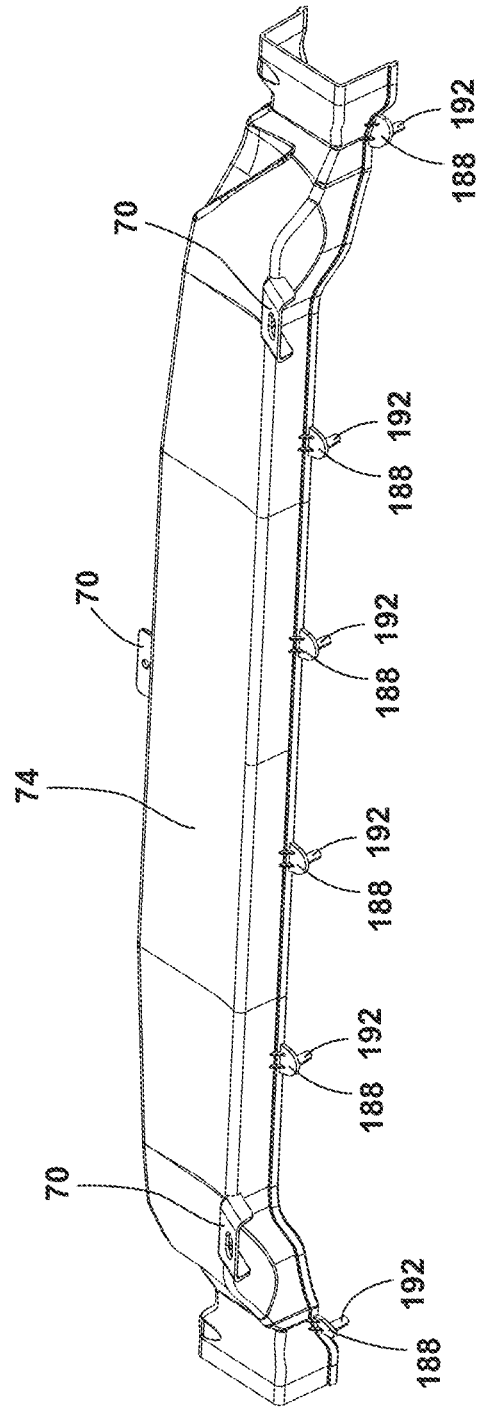
FIG. 12 is a bottom perspective view of the lower part of the duct.

FIGS. 11-12 show the lower part 74 of the duct 22. The lower part 74 of the duct 22 may include flanges 188 with projections 192 for attaching the lower part 74 of the duct 22 to the flanges 184 with holes 180 of the upper part 78 of the duct 22. The lower part 74 of the duct 22 includes fasteners 70 for attaching the lower part 74 of the duct 22 to the vehicle interior 50.

Figure 13:
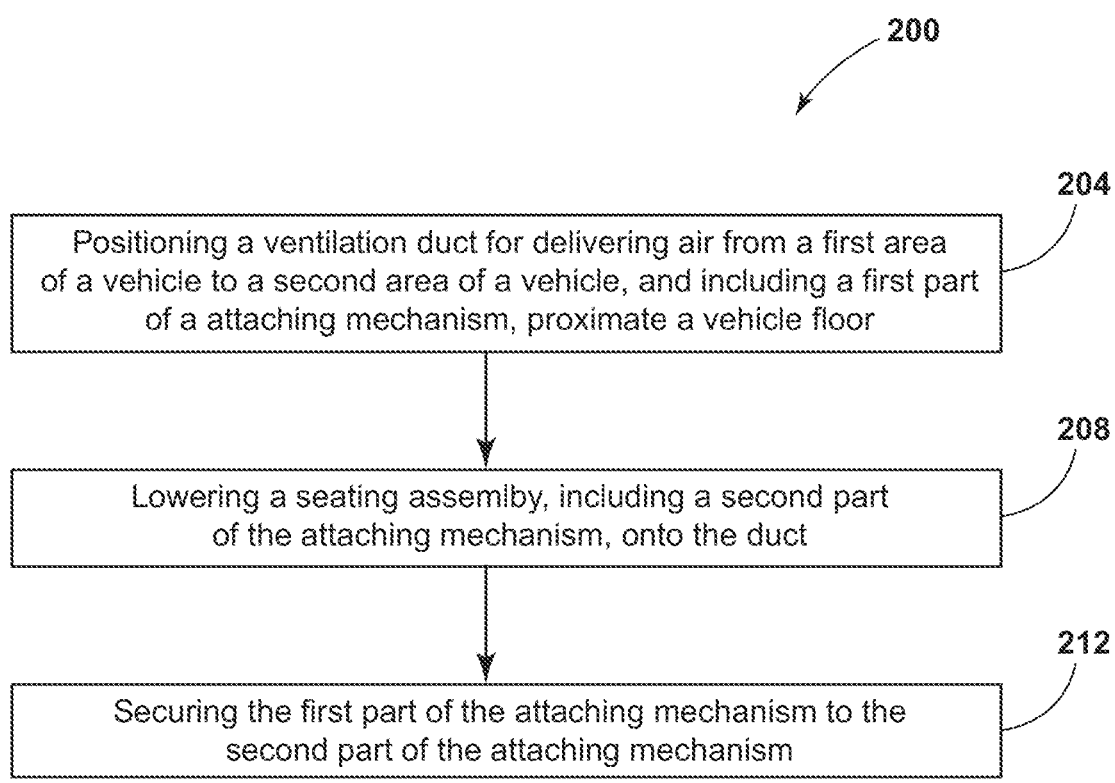
FIG. 13 is a flow chart showing the method for installing a seating assembly in a vehicle.

FIG. 13 shows the steps for the method 200 of installing a seating assembly 10 in a vehicle. Step 204 includes positioning a ventilation duct 22 for delivering air from a first area (for example, proximate side wall 54) of a vehicle 18 to a second area (for example, proximate side wall 58) of a vehicle 18, and includes a first part of an attaching mechanism 82, proximate a vehicle floor 26. Step 208 includes lowering a seating assembly 10, including a second part of the attaching mechanism 82, onto the duct 22. Step 212 includes securing the first part of the attaching mechanism 82 to the second part of the attaching mechanism 82. In some examples, the first part of the attaching mechanism 82 may include the hook 86. In some examples, the second part of the attaching mechanism 82 may include a loop 90.

In addition to the location of the duct 22 above the tire well, it is to be understood that the duct 22 and the ventilation assembly 120 may be used in other locations in the vehicle interior 50.

It is to be understood that, in various examples, the duct 22 may be disposed below various seats and/or seating assemblies (for example, captain's seats, bench seats, etc.) in a vehicle 18.

It is to be understood that, in various examples, the duct 22 may also be disposed below vehicle components other than seats and/or seating assemblies that may be secured to the duct 22.

It is to be understood that an air mover may be positioned relative to the duct 22 to move air through the duct by pushing air through the duct 22 or by pulling air through the duct 22.

It is to be understood that the duct 22 may be designed to support the seat 62. Design of the duct 22 may involve selection of materials, cross-sectional shape, size, weight, and other inputs relevant to the strength of the duct 22.

A variety of advantages may be obtained from use of the present disclosure. The duct 22 may be used as a structural member for supporting the front of the seat 62. The attaching mechanism 82 disposed at the front of the seat 62 and the front of the duct 22 may be a locating feature (for example, locating pocket 94) that may aid in installation of the front of the seat 62 in a hands-free manner during vehicle assembly while the seat 62 is fully installed in a separate operation at the rear of the vehicle 18. The molded hook 86 with the locating pocket 94 may allow for hands-free assembly at the manufacturing facility in a crowded seat installation station. Use of the duct 22 may provide a weight savings. A composite duct may replace heavier metal parts that may have been used to support the seating assembly 10. The attaching mechanism 82 of the seating assembly 10 to the duct 22 may be minimally visible to passengers. Additionally, the floor liner 160 may substantially conceal the attaching mechanism 82 from passengers.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A ventilation assembly for a vehicle, the ventilation assembly comprising:
   a duct operably coupled with a seating assembly via an attacher disposed within a locating pocket defined by the duct, wherein the duct is above a vehicle floor and including:
      a first end having a first opening disposed at a first area of the vehicle; and
      a second end having a second opening disposed at a second area of the vehicle; and
   an air mover disposed at one or more of the first and the second ends of the duct, wherein the air mover is operable to move air along the duct.

2. The ventilation assembly for a vehicle of claim 1, wherein the duct provides a structural support for the vehicle seating assembly.

3. The ventilation assembly for a vehicle of claim 2, wherein the first end of the duct is disposed proximate a first vehicle wall.

4. The ventilation assembly for a vehicle of claim 3, wherein the second end of the duct is disposed proximate a second vehicle wall.

5. The ventilation assembly for a vehicle of claim 4, wherein the first end is coupled to a HVAC unit.

6. The ventilation assembly for a vehicle of claim 5, wherein the attacher is disposed between the duct and the seating assembly.

7. The ventilation assembly for a vehicle of claim 6, wherein the attacher is disengaged prior to installation of the seating assembly in an interior of the vehicle.

8. The ventilation assembly for a vehicle of claim 7, wherein the attacher is engaged after the installation of the seating assembly in the vehicle interior.

9. The ventilation assembly for a vehicle of claim 8, wherein the attacher includes a first part disposed on the duct and a second part disposed on the seating assembly.

10. The ventilation assembly for a vehicle of claim 9, wherein the first part includes a hook.

11. The ventilation assembly for a vehicle of claim 10, wherein the second part includes a loop.

12. The ventilation assembly for a vehicle of claim 11, wherein the hook extends from the locating pocket, and wherein the loop is positioned in the locating pocket when attacher is engaged.

13. The ventilation assembly for a vehicle of claim 12, wherein the hook includes a downward sloping portion protruding from the duct and terminating at a cantilevered portion extending outward from the duct.

14. A support structure for a vehicle seat, the support structure comprising:
a duct extending between a first and a second area of a vehicle and positioned below the vehicle seat and including:
a first end coupled to an air source; and
a second end coupled to an air distribution device having an outlet extending into a vehicle cabin; and
an attacher disposed in a locating pocket defined by the duct and coupled with an underside of the vehicle seat and positionable in an engaged position to secure the vehicle seat to the duct.

15. The support structure for a vehicle seat of claim 14, further comprising:
a floor liner disposed on the duct.

16. The support structure for a vehicle seat of claim 15, wherein a portion of the attacher disposed between the duct and the vehicle seat extends through the floor liner.

17. The support structure for a vehicle seat of claim 16, wherein the duct includes an upper portion coupled to a lower portion.

18. The support structure for a vehicle seat of claim 17, wherein the locating pocket for positioning the attacher is disposed in the upper portion of the duct.

19. A method for installing a seating assembly in a vehicle, the method for installing a seating assembly comprising:
positioning a ventilation duct, including a first part of an attacher disposed within a locating pocket defined by the ventilation duct, for delivering air from a first area of a vehicle to a second area of the vehicle proximate a vehicle floor;
lowering the seating assembly, including a second part of the attacher, onto the duct; and
securing the first part of the attacher to the second part of the attacher.

20. The method for installing a seating assembly in a vehicle of claim 19, further comprising:
positioning the duct so that it extends between opposing walls of a vehicle interior; and
placing a front portion of a seat disposed in the seating assembly over the duct.

* * * * *